United States Patent Office 3,072,608
Patented Jan. 8, 1963

3,072,608
POLYMERIZATION OF ETHYLENE
William H. Byler, Orange, Tex., assignor to Spencer Chemical Company, Kansas City, Mo., a corporation of Missouri
No Drawing. Filed July 23, 1959, Ser. No. 828,939
10 Claims. (Cl. 260—94.9)

This invention relates to a process for manufacturing solid polymers of olefins such as ethylene by subjecting the olefin to the effect of super atmospheric pressures at somewhat elevated temperatures in the presence of an initiator system consisting of a peroxide initiator activated by an organic nitrogenous accelerator.

This application is a continuation-in-part of my copending application Serial No. 772,412, filed November 7, 1958, now abandoned.

The use of free radial-providing organic peroxides as initiators for vinyl type polymerization is well known, and any means by which their range of operating temperatures may be widened will be useful. It is also known that amines, particularly tertiary amines, may be used to accelerate the action of peroxide initiators and thereby broaden their range of usefulness, particularly in the lower ranges of temperature. Polymerization at lower temperatures such as about 275° F. tends to produce a stiff, harder polymer of higher density which has more desirable physical properties when used for certain purposes. Known initiator-accelerators that function at temperatures low enough to produce the desired higher density polymer decompose rather rapidly and sometimes dangerously at room temperatures. Certain other initiator-accelerators function at higher temperatures and do not decompose at room temperatures; however, when functioning at higher temperatures the desired higher density polymers are not obtained. An initiator having great commercial value would be one that could be accelerated so that it would function at a temperature low enough to produce the higher density polymer without its room temperature decomposition rate being increased after acceleration and before use as an initiator. Such increased decomposition would decrease the efficiency of the peroxide and would cause an undesirable odor and color in the polymer.

Initiators found useful in the polymerization of lower olefins and particularly ethylene at pressures above 10,000 p.s.i. are alkyl peroxides such as ditertiary butyl peroxide, peroxydicarbonates as for example diisopropyl peroxydicarbonate, per-esters such as tertiary butyl perbenzoate and tertiary butyl peracetate, per-acids such as peracetic acid and peroxides of aliphatic carboxylic acids of the type

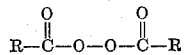

wherein R represents an alkyl group of 1 to 18 carbons, such as caprylyl, capsyl, caproyl, lauroyl, stearoyl and acetyl peroxides. Such unaccelerated peroxides initiate ethylene polymerization quite satisfactorily; however, in the past, attempts to make them function without the addition of an accelerator at lower temperatures in order to produce the more dense polymers have failed.

One such initiator that has been found particularly useful in the polymerization of lower olefins and particularly ethylene at pressures above 10,000 p.s.i. is caprylyl peroxide. Unaccelerated caprylyl peroxide initiates ethylene polymerization quite satisfactorily at temperatures above 350° F. and is relatively stable at room temperature. In the past, however, attempts to make it function without the addition of an accelerator to produce the more dense polymers at lower temperatures, such as about 275° F., were not satisfactory.

Caprylyl peroxide, as well as the other described peroxides, may be used successfully as an initiator in combination with almost any amine in a batch ethylene polymerization system; however, because the usual amine initiator-accelerator causes caprylyl peroxide to decompose at room temperature, it cannot be used in a continuous flow ethylene polymerization system.

A continuous flow ethylene polymerization system is the most efficient system for commercial production because it reduces the contact time between the ethylene and the initiator and thus makes possible the production of more polyethylene per equipment investment than is the case with a batch operation. In a continuous flow system, the initiator and accelerator should be mixed prior to entering the reactor. If the initiator and accelerator are inserted separately and discretely into a flow system reactor, these materials become so diluted in the ethylene mass that the accelerator has little or no opportunity to accelerate the activity of the initiator. Mixing caprylyl peroxide and the usual amine initiator-accelerators prior to introduction into the reactor has not been suitable because, as mentioned above, the peroxide then decomposes at room temperature causing an inferior polymer and inefficient initiation.

According to the present invention, it has been discovered that the initiating activity of the described peroxides, to make polyolefins, such as polyethylene, from olefins having not more than three carbons is increased by the addition of a small amount of triphenylamine.

The addition of triphenylamine to the described peroxides improves the efficiency and broadens the useful temperature range of the initiator. In the case of caprylyl peroxide, the minimum controllable reaction temperature of a continuous flow process system is lowered from about 350° F. to about 240° F. At temperatures above 215° F., triphenylamine acts as an accelerator by decomposing the caprylyl peroxide to free radicals; however, to obtain a controllab'e polymerization process, especially in a flow system, a minimum temperature of about 240° F. is employed. There is no narrow maximum temperature below which the polymerization must be effected although it is ordinarily advisable to employ a reaction temperature below 375° F.

Surprisingly, triphenylamine does not increase the decomposition rate of caprylyl peroxide at room temperatures when present at concentrations suitable for accelerating the peroxide in the polymerization process. This is also true for the other peroxide-triphenylamine compound mixtures and is particularly so with the acyl peroxides. Stability of the caprylyl peroxide-triphenylamine mixture at room temperature is equal to that of caprylyl peroxide alone.

Although the caprylyl peroxide-triphenylamine mixture, and other mixtures within the scope of this invention, do not decompose at room temperature, it is reactive at polymerization temperatures low enough to produce a polymer with improved physical and chemical properties. Thus, the product is of higher density and more stiff than material made at higher temperatures.

A desirable economic advantage results from the increased activity of these mixtures, such as caprylyl peroxide mixed with triphenylamine, in that it is possible thereby to use a smaller quantity of initiator per pound of polymer produced, thus increasing the yield of polymer per unit weight of initiator.

In practicing this invention the peroxide, such as caprylyl peroxide, and triphenylamine, should be mixed together either in a line leading to the reactor, or in a mixing tank, prior to entry into the polymerization chamber. In general, the peroxide and triphenylamine should be mixed together for a short time before introducing the mixture into the reactor. It is thus preferred to mix these materials at least two minutes before introduction into the reactor.

Combining pure peroxide such as caprylyl peroxide with triphenylamine causes an extremely rapid decomposition of the peroxide even at room temperature. It is advisable, therefore, to dilute the peroxide with an inert organic liquid carrier such as mineral oil before adding the amine in order to help stabilize the mixture. The quantity of diluent used depends upon the concentration of amine in the peroxide and the ambient temperature. The viscosity of the mineral oil aids in forming a more easily pumped solution. Triphenylamine is not very soluble in mineral oil so it is first dissolved in a solvent, such as benzene, and added in such a solution to the mineral oil. At higher polymerization pressures it is desirable to use mixtures of benzene and a liquid with a lower freezing point, such as hexane, in order to prevent freezing at such pressures.

The caprylyl peroxide, or an equivalent peroxide, and suitable viscous liquid mixture, and triphenylamine and solvent mixture then can be mixed together such as by use of a mixing T, prior to entering the flow system reactor. If the materials are mixed together batch-wise, as in a mixing tank, before introduction into a continuous flow system reactor, a low freezing point solvent, such as hexane, is not necessarily employed since the mixture does not freeze when added completely mixed.

Since mixtures of a peroxide, such as caprylyl peroxide, and triphenylamine are stable at room temperature, such mixtures can be prepared and stored for subsequent use, or for shipment to various different locations.

The following examples are presented to illustrate, but not limit, the invention.

Example 1

A 1% solution of triphenylamine is dissolved in a solvent consisting of equal parts of benzene and hexane. A 25% mixture of caprylyl peroxide in mineral oil is then made up. These two mixtures are metered by separate control valves to a mixing T following which the caprylyl peroxide and triphenylamine are mixed for a period of four to six minutes before introduction into an ethylene polymerization flow system reactor. Synthesis in the flow system commences at 350° F. but immediately after injection of the accelerated initiator into the reactor the reaction control improves, indicating that an acceleration of the decomposition rate of the caprylyl peroxide takes place. The pressure is maintained at about 21,300 p.s.i. Initiator and accelerator strength are 1620 and 57 parts respectively, per million parts of concentration in the reactor.

Example 2

The increased activity imparted by the quantity of triphenylamine in Example 1 makes it possible to divide the caprylyl peroxide concentration in half. A mixing T is used and the synthesis temperature in the ethylene flow system reactor is gradually lowered from a light-off temperature of 350° F. to the point of loss of control, 240° F. Polymerization pressure in the flow system is maintained at about 22,000 p.s.i. Initiator and accelerator strength are 392 and 38 parts respectively per million parts of concentration in the reactor.

Example 3

One part by weight of triphenylamine is dissolved in ten parts by weight of benzene and this mixture is added to a mixture of 87.5 parts by weight of mineral oil and 12.5 parts by weight of caprylyl peroxide. This material is pumped to a flow system type ethylene polymerization reactor when the ethylene pressure is maintained at 19,000 p.s.i. and the temperature is kept at 290° F. Initiator and accelerator strength are 280 and 23 parts respectively, per million parts of concentration in the reactor.

Example 4

One part by weight of triphenylamine is dissolved in ten parts by weight of benzene and this mixture is added to a mixture of 875 parts by weight of mineral oil and 125 parts by weight of caprylyl peroxide. This material is pumped to a flow system type ethylene polymerization reactor where the ethylene is maintained at 24,000 p.s.i. and the temperature is kept at 275° F. Initiator and accelerator strength are 250 and 2 parts respectively, per million parts of concentration in the reactor.

Example 5

A solution of acetyl peroxide was prepared having the following composition:

750 parts by weight of acetylperoxide
1250 parts by weight of dimethylphthalate
1410 parts by weight of benzene
13 parts by weight of triphenylamine in 124 parts benzene No decomposition of the solution of benzene was observed at storage conditions. Initiator and accelerator strength were 710 and 13 parts respectively, per million parts of concentration in the reactor.

The solution was pumped to a flow system type ethylene polymerization reactor where ethylene was maintained at 17,500 p.s.i. and the temperature at 245° F. at which adequate reaction control was maintained. The polyethylene so produced had the following characteristics:

| | |
|---|---|
| Melt index | 7.8 |
| Yield point p.s.i. | 1490 |
| Ultimate strength p.s.i. | 1320 |
| Elongation percent | 500 |
| Density | .9209 |
| Vicat ° C. | 90.0 |

Example 6

A solution was prepared having the following composition:

100 gm. of diisopropylperoxydicarbonate
100 gm. of benzene
1800 gm. of mineral oil
6 gm. of triphenylamine
61 gm. of benzene The solution was stable at room temperature.

The described solution was pumped to a flow system type ethylene polymerization reactor where the ethylene was maintained at 21,100 p.s.i. and a temperature of 230° F. was used at which the reaction was readily controlled.

The described 5% peroxide solution was suitable for the polymerization whereas, without the triphenylamine, an 18% by weight peroxide solution was required for the polymerization. Initiator and accelerator strength were 176 and 11 parts, respectively, per million parts of concentration in the reactor.

Example 7

A solution was prepared having the following composition:

400 gm. of di-tert-butyl peroxide
7600 gm. of mineral oil
13.3 gm. of triphenylamine
134 gm. of benzene This solution was stable at room temperature.

The solution was pumped to a flow system type ethylene polymerization reactor where the ethylene was maintained at 14,000 p.s.i. and the temperature at 330°–350° F. The polyethylene so produced had a melt index of 20. Initiator and accelerator strength were 176 and 11 parts, respectively, per million parts of concentration in the reactor.

Example 8

A solution was prepared having the following composition:

> 600 gm. of lauroyl peroxide
> 3600 gm. of benzene
> 3600 gm. of mineral oil
> 20 gm. of triphenylamine
> 201 gm. of benzene The solution was stable at room temperature.

The solution was pumped to a flow system type ethylene polymerization reactor where the ethylene was maintained at 16,000 to 18,000 p.s.i. and at a temperature of 257° F. Solid polyethylene was produced. The usage of lauroyl peroxide was 1/10 that when no triphenylamine is employed. Initiator and accelerator strength were 250 and 8 part, respectively, per million parts of concentration in the reactor.

Example 9

A solution was prepared having the following composition:

> 400 gm. of tertiary butyl peracetate
> 7600 gm. of mineral oil
> 13.3 gm. of triphenylamine
> 134 gm. of benzene The solution was storable at room temperature.

The solution was pumped to a flow system type ethylene polymerization reactor where the ethylene was maintained at 12,500 p.s.i. and at a temperature of 280° F. Initiator and accelerator strength were 132 and 8 parts, respectively, per million parts of concentration in the reactor.

Various changes and modifications of the invention can be made and, to the extent that such variations incorporate the spirit of this invention, they are intended to be included within the scope of the appended claims.

What is claimed is:

1. The process of polymerizing a lower olefin having not more than three carbons which comprises contacting said olefin with a free radical-providing organic peroxide and triphenylamine in intimate mixture at a polymerization pressure above 10,000 p.s.i. and a temperature from about 240° F. to 375° F.

2. The process of polymerizing a lower olefin having not more than three carbons which comprises contacting said olefin with a free radical-providing organic acyl peroxide of the formula

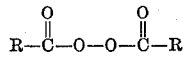

and triphenylamine in intimate mixture at a polymerization pressure above 10,000 p.s.i. and a temperature from about 240° F. to 375° F., wherein R is an alkyl group of 1 to 18 carbons.

3. The process of claim 2 in which R is caprylyl.

4. The process of polymerizing ethylene with a free radical-providing organic peroxide and triphenylamine in intimate mixture at a polymerization pressure above 10,000 p.s.i. and a temperature from about 240° F. to 375° F.

5. The process of claim 4 in which the peroxide has the formula

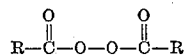

in which R is an alkyl group of 1 to 18 carbons.

6. The process of claim 4 in which the peroxide is caprylyl peroxide.

7. The process of claim 4 in which the peroxide is lauroyl peroxide.

8. The process of claim 4 in which the peroxide is tertiary butyl peracetate.

9. The process of claim 4 in which the peroxide is diisopropylperoxydicarbonate.

10. The process of claim 4 in which the peroxide is di-ter-butyl peroxide.

References Cited in the file of this patent

UNITED STATES PATENTS

| | | |
|---|---|---|
| 2,365,506 | Alexander et al. | Dec. 19, 1944 |
| 2,558,139 | Knock et al. | June 26, 1951 |
| 2,865,904 | Seed et al. | Dec. 23, 1958 |

FOREIGN PATENTS

| | | |
|---|---|---|
| 755,167 | Great Britain | Aug. 15, 1956 |

UNITED STATES PATENT OFFICE
CERTIFICATE OF CORRECTION

Patent No. 3,072,608 January 8, 1963

William H. Byler

It is hereby certified that error appears in the above numbered patent requiring correction and that the said Letters Patent should read as corrected below.

Column 1, line 18, for "radial" read -- radical --; column 5, line 17, for "part" read -- parts --.

Signed and sealed this 2nd day of July 1963.

(SEAL)
Attest:

ERNEST W. SWIDER
Attesting Officer

DAVID L. LADD
Commissioner of Patents